United States Patent
Chen

(10) Patent No.: US 6,491,597 B2
(45) Date of Patent: Dec. 10, 2002

(54) FRONT SPEED CHANGING DEVICE

(75) Inventor: Ming-Hung Chen, Taichung Hsien (TW)

(73) Assignee: Falcon Industrial Co., Ltd. (TW)

( * ) Notice: Subject to any disclaimer, the term of this patent is extended or adjusted under 35 U.S.C. 154(b) by 29 days.

(21) Appl. No.: 09/849,226

(22) Filed: May 7, 2001

(65) Prior Publication Data

US 2002/0165054 A1 Nov. 7, 2002

(51) Int. Cl.[7] .............. F16H 9/00; F16H 63/00
(52) U.S. Cl. ........................... 474/82; 474/80
(58) Field of Search ............... 474/80, 81, 82, 474/78

(56) References Cited

U.S. PATENT DOCUMENTS

| | | | | | |
|---|---|---|---|---|---|
| 4,030,374 A | * | 6/1977 | Isobe | ............ | 474/82 |
| 4,279,605 A | * | 7/1981 | Egami | ............ | 474/82 |
| 4,362,522 A | * | 12/1982 | Huret | ............ | 474/82 |
| 5,624,336 A | * | 4/1997 | Kojima | ............ | 474/82 |
| 5,779,581 A | * | 7/1998 | Fujii | ............ | 474/80 |
| 5,816,966 A | * | 10/1998 | Yang et al. | ............ | 474/82 |
| 6,146,298 A | * | 11/2000 | Nanko | ............ | 474/80 |
| 6,234,927 B1 | * | 5/2001 | Peng | ............ | 474/80 |
| 6,341,538 B1 | * | 1/2002 | Takachi | ............ | 474/82 |

FOREIGN PATENT DOCUMENTS

JP  0624376 A  *  9/1994

* cited by examiner

Primary Examiner—David A. Bucci
Assistant Examiner—Marcus Charles
(74) Attorney, Agent, or Firm—Browdy and Neimark, P.L.L.C.

(57) ABSTRACT

A front speed changing device comprises a base, a first link rod, a second link rod, a chain guiding member, a driven member, and a linking member, which form together a six-link-rod linking mechanism. The driven member is fastened with a pull cord. When the pull cord is pulled, the driven member swivels to link each rod member to engage in the swiveling action, thereby driving the chain guiding member to guide a chain to displace horizontally to attain the speed change.

5 Claims, 8 Drawing Sheets

FRONT SPEED CHANGING DEVICE

FIELD OF THE INVENTION

The present invention relates generally to a bicycle component part, and more particularly to a bicycle front speed changing device.

BACKGROUND OF THE INVENTION

The bicycle front speed changing device uses a pull cord to draw a link rod mechanism to drive a chain guiding device which guides a chain to swivel aside horizontally, thereby resulting in a change in speed. The pivoting end of the link rod mechanism is divided into an upper swiveling type and a lower swiveling type, which are corresponding in location to the fastening end of the front speed changing device. The drawing of the pull cord is attained by two forms. In the first place, one end of the pull cord runs through the frame bottom and then runs upwards to be fastened with a start end of the link rod mechanism. The start end is pulled by the pull cord to swivel downwards to drive indirectly the chain to displace outwards and horizontally. The second form involves the pull cord which is directly put through a lug of the upright tube to be fastened with the start end of the link rod mechanism. The pull rod does not run through the frame bottom. The start end is pulled to swivel upwards to cause the chain to displace outwards and horizontally.

The second form is not suitable for the front speed changing device of the lower swiveling type. As shown in FIG. 1, one end of the pull cord 1 is put through a lug 2a of the bicycle upright tube 2 to be fastened with a start end 3a of the link rod mechanism 3. The start end 3a must be disposed toward the outer side of the upright tube 2, so as to enable the link rod mechanism 3 to swivel. The pull cord 1 is slanted such that the exposed portion of the pull cord 1 is apt to interfere with the bicyclist's pants or shoe strings. The front speed changing device of the lower swiveling type is apparently not suitable for use in conjunction with the bicycle having the lug. However, the bicycle upright tube is generally provided with the lug.

SUMMARY OF THE INVENTION

The primary objective of the present invention is to provide a front speed changing device which enables the pulling form of the pull cord of the front speed changing device of the lower swiveling type to be widely adaptable.

The front speed changing device of the present invention comprises a base secured to the bicycle frame; a chain guiding member for guiding a chain to displace between a first position and a second position; a first link rod which is pivoted at the first end with the base and is connected at the second end with the chain guiding member; a recovery member for use in enabling the chain guiding member to guide the chain to swivel toward the first position; and a pull cord capable of resisting the recovery force of the recovery member at the time when the pull cord is drawn, thereby causing the chain guiding member to guide the chain to displace horizontally toward the second position. The present invention is characterized by the second link rod which further has an extension end. The first end of the second link rod is located between the extension end and the second end. A driven member is pivoted with the base and has a protruded portion and a start end. A linking member has a first end which is pivoted with the extension end of the second link rod, and a second end which is pivoted with the protruded portion of the driven member. The pull cord is fastened at one end with the start end of the driven member.

DETAILED DESCRIPTION OF THE INVENTION

Figure 1:
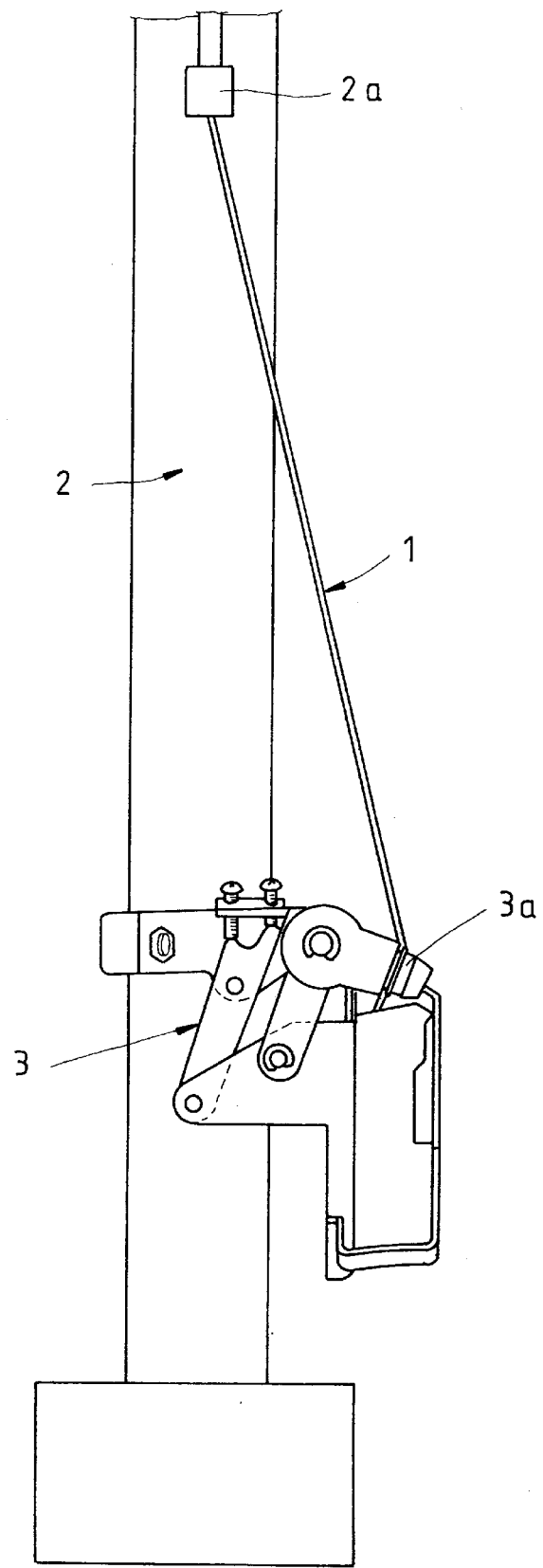
FIG. 1 shows a schematic view of the structure of a prior art front speed changing device of the lower swiveling type.
Figure 2:
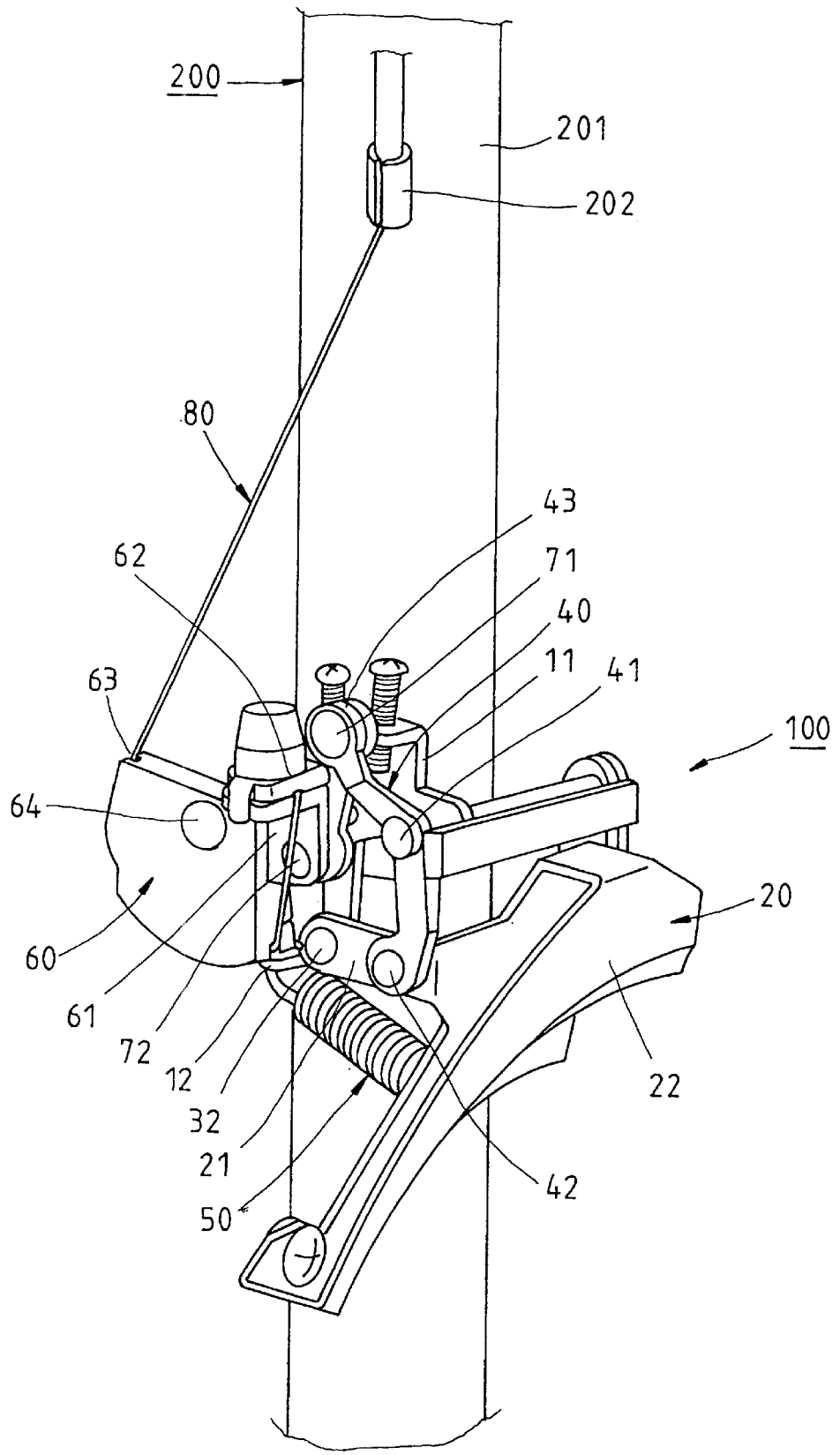
FIG. 2 shows a perspective view of the front speed changing device of the present invention.
Figure 3:
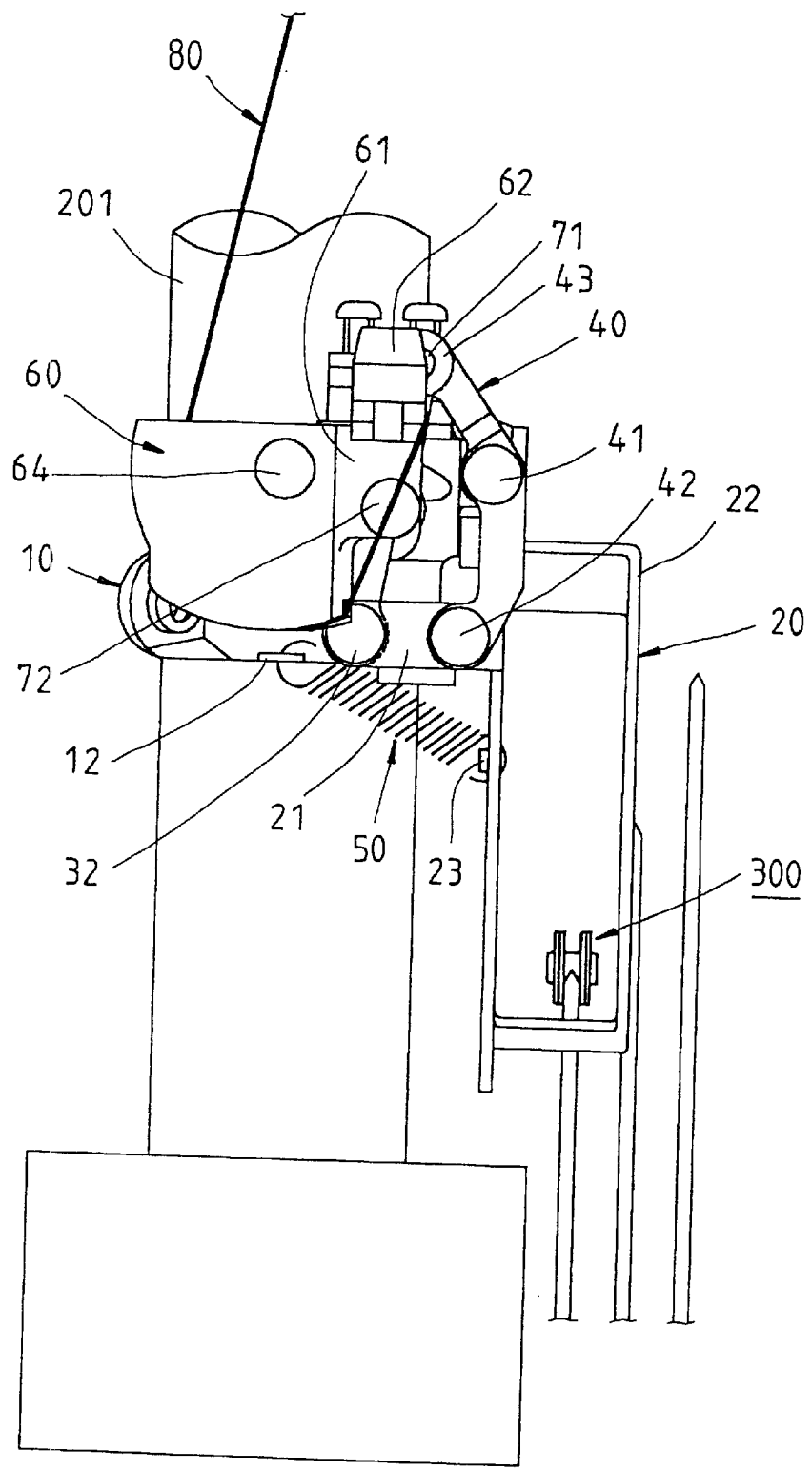
FIG. 3 shows a first application case and front view of the present invention to explain the link rod mechanism in the inactive state.
Figure 4:
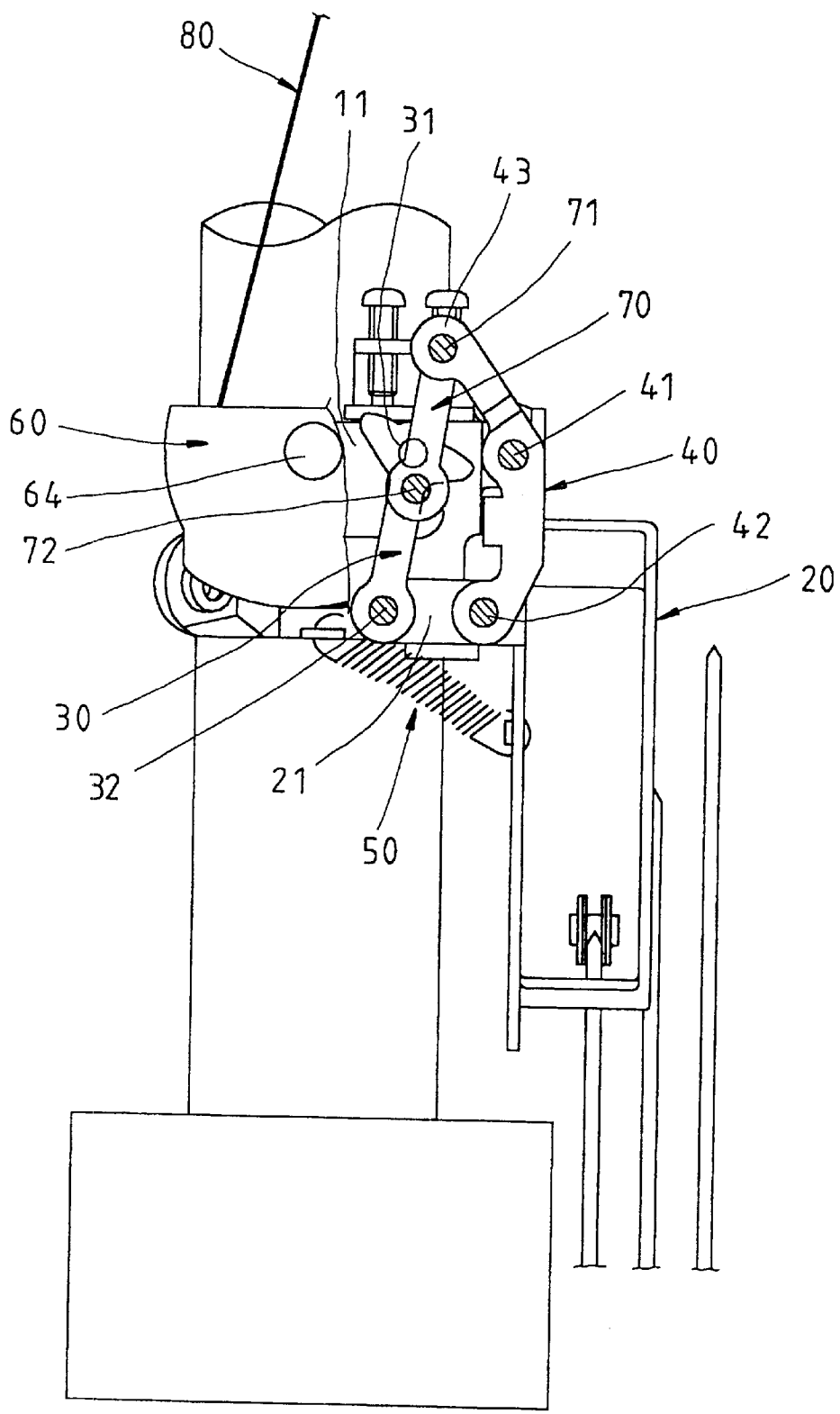
FIG. 4 shows a partial sectional view of the front speed changing device as shown in FIG. 3.

As shown in FIGS. 2–4, a front speed changing device 100 of the lower swiveling type of the present invention comprises a base 10, a chain guiding member 20, a first link rod 30, a second link rod 40, a recovery member 50, a driven member 60, a linking member 70, and a pull rod 80. The base 10, the first link rod 30, the second link rod 40 and the chain guiding member 20 form together a four-link-rod mechanism.

The base 10 has a lashing ring (not shown in the drawing) which is fastened with an upright tube 201 of the bicycle frame 200. A base plate 11 side is disposed at one side of the lashing ring. A first hooked portion 12 is disposed at a corner under the base plate 11.

The chain guiding member 20 is used to guide a chain 300 to displace horizontally between a first position (inner side of toothed disk) and a second position (outer side of toothed disk). The chain guiding member 20 has a fastening plate 21 and a guide frame 22. The chain 300 is put through the guide frame 22. The guide frame 22 has a second hooked portion 23 in proximity of one side of the base 10.

The first link rod 30 is pivoted at the first end by a first shaft 31 with the base plate 11 of the base 10, and at the second end by a first pivot 32 with the fastening plate 21 of the chain guiding member 20.

The second link rod 40 is pivoted at it's mid-section by a second shaft 41 with the base plate 11 of the base 10, and at the second end by a second pivot 42 with the fastening plate 21 of the chain guiding member 20. The second link rod 40 further has an extension end 43 which is disposed over the first end such that it faces the first link rod 30, thereby enabling the second shaft 41 to locate between the extension end 43 and the second pivot 42.

The recovery member 50 is a tension spring and is fastened at one end with the first hooked portion 12 of the base 10, and at other end with the second hooked portion 23 of the chain guiding member 20. The recovery member 50 is used to keep the chain guiding member 20 to swivel toward the first position.

The driven member 60 is a sectoral block body which is provided in one side with a lug 61, and a start end 62 located over the lug 61. The block body is provided along the side wall with a guide groove 63. A third shaft 64 is put through the block body to fasten with the base plate 11 of the base 10. The driven member 60 swivels on the third shaft 64 serving as an axis.

The linking member 70 is a rod body and is connected at the first end by a third pivot 71 with the extension end 43 of the second link rod 40, and at the second end by a fourth pivot 72 with the lug 61 of the driven member 60. The fourth pivot 72 and the third pivot 64 are separated from each other by a distance.

The pull cord 80 is a steel cable, which is connected at one end to a speed changer control device (not shown in the drawing), and at other end with the start end 62 of the driven member 60.

The first shaft 31, the second shaft 41 and the third shaft 64 of the front speed changing device 100 are pivoted with the base plate 11 of the base 10 to form the fixed fulcrums. The first pivot 32, the second pivot 42, the third pivot 71, and the fourth pivot 72 serve as the pivoting members of the component parts such that they form the movable fulcrums.

As shown in FIGS. 2 and 3, the pull cord 80 is disposed along the upright tube 201 such that one end of the pull cord 80 is put through the lug 202, thereby enabling the body of the pull cord to be pulled out of other side of the driven member 60 via one side of the driven member 60 and the guide groove 63, so as to change the pulling direction of the pull cord 80. The pull cord 80 is fastened securely with the start end 62.

As shown in FIG. 3, the chain 300 is engaged with the inner side toothed disk. In the meantime, the recovery member 50 pulls the chain guiding member 20 which is located at the first position. The first pivot 32 and the second pivot 42 are rested on the upright tube 201.

Figure 5:
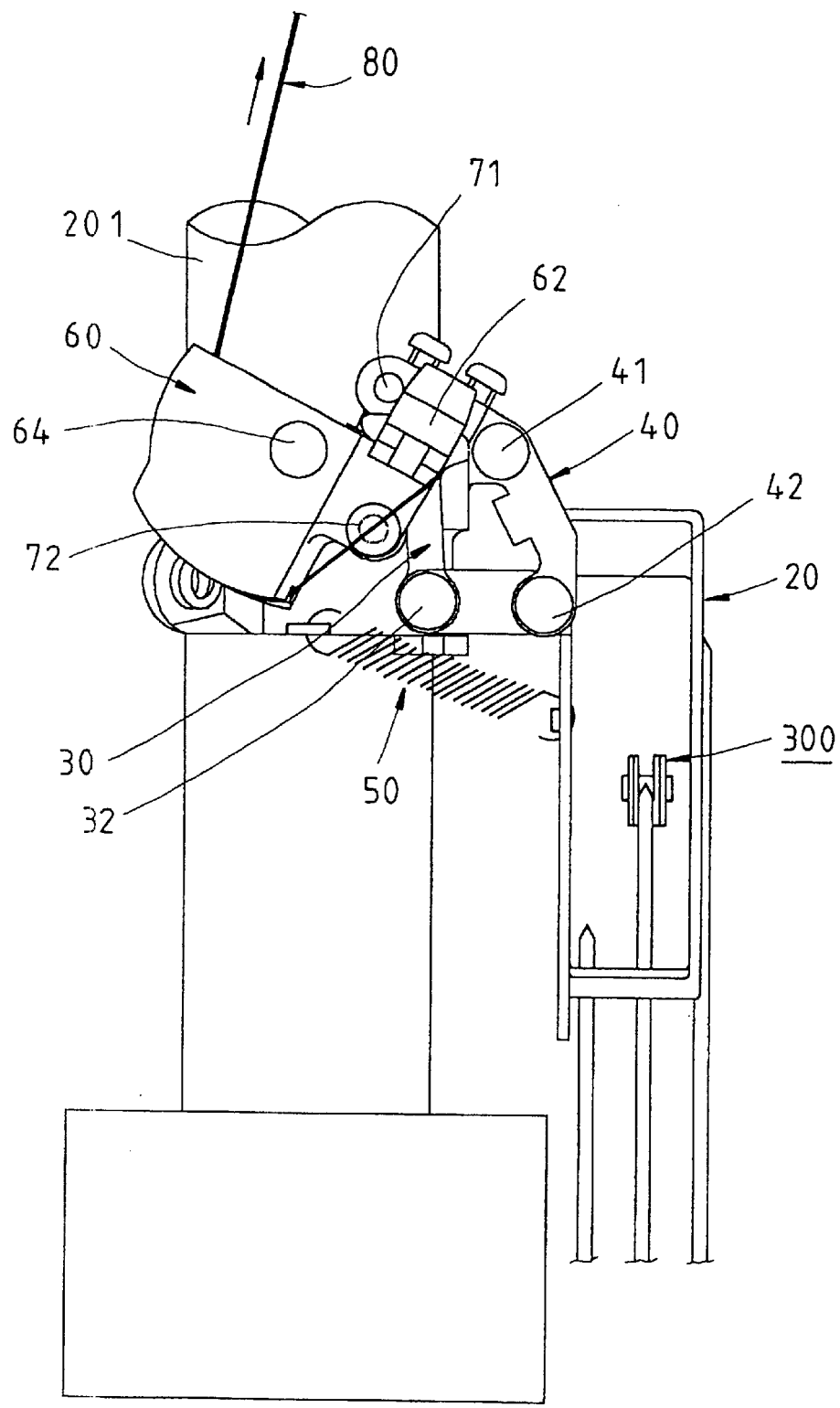
FIG. 5 shows a schematic view of the first application case of the present invention to explain the link rod mechanism in the state of swiveling action.
Figure 6:
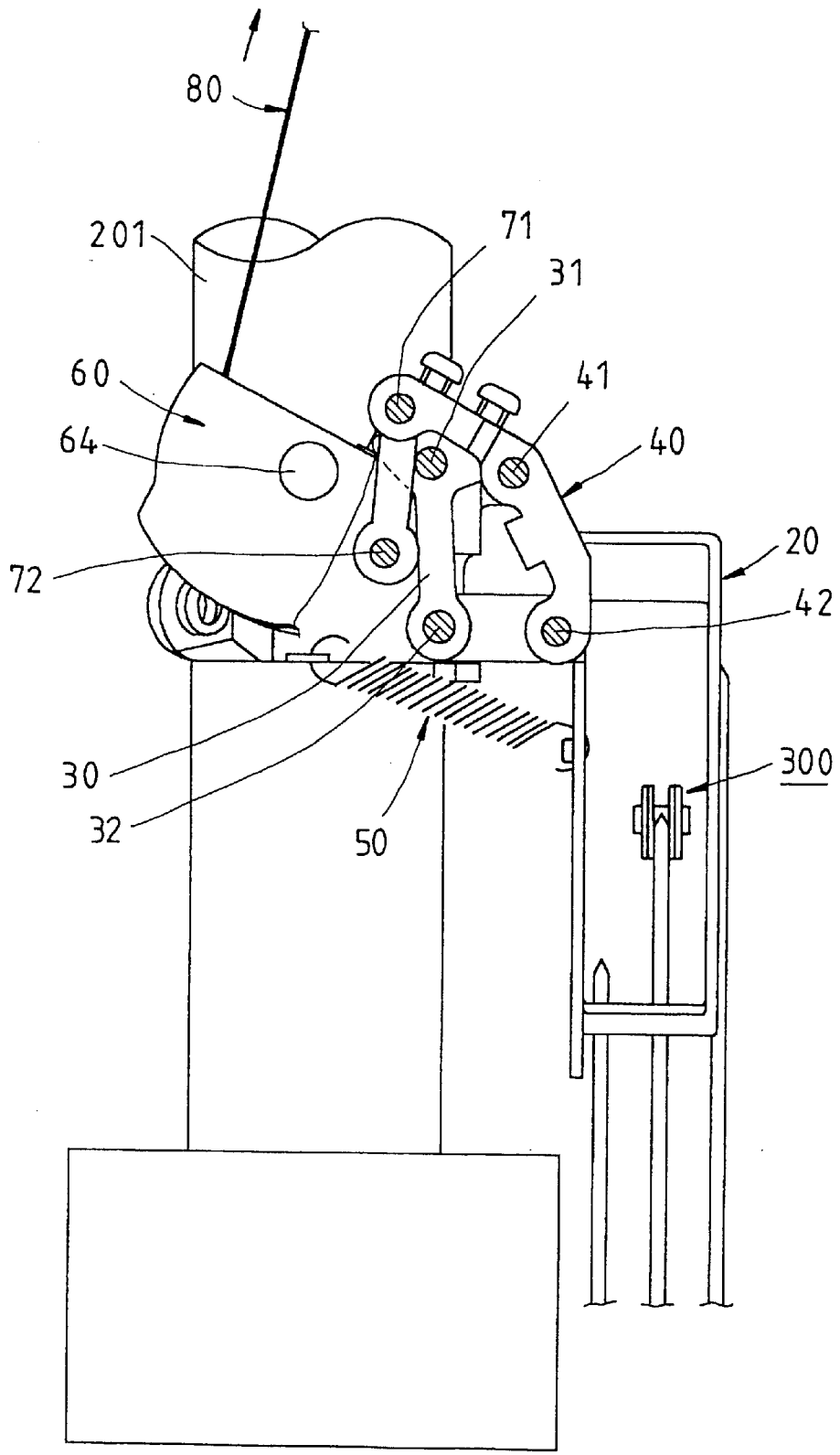
FIG. 6 shows a partial sectional view of the front speed changing device as shown in FIG. 5.

As shown in FIGS. 5 and 6, when the pull cord 80 is pulled, the pull cord 80 pulls the start end 62 via the driven member 60 such that the start end 62 swivels downwards on the third shaft 64, thereby actuating the linking member 70 to displace downward. The linking member 70 actuates the second link rod 40 to turn on the second shaft 41 in a counterclockwise direction. The third pivot 71 displaces downward. The second pivot 42 swivels outwards and upwards. The second link rod 40 enables the entire link rod mechanism to act to counter the recovery force of the recovery member 50. The chain guiding member 20 is driven to displace horizontally toward the second position. The chain 300 is thus guided by the chain guiding member 20 to attain the speed change.

Figure 7:
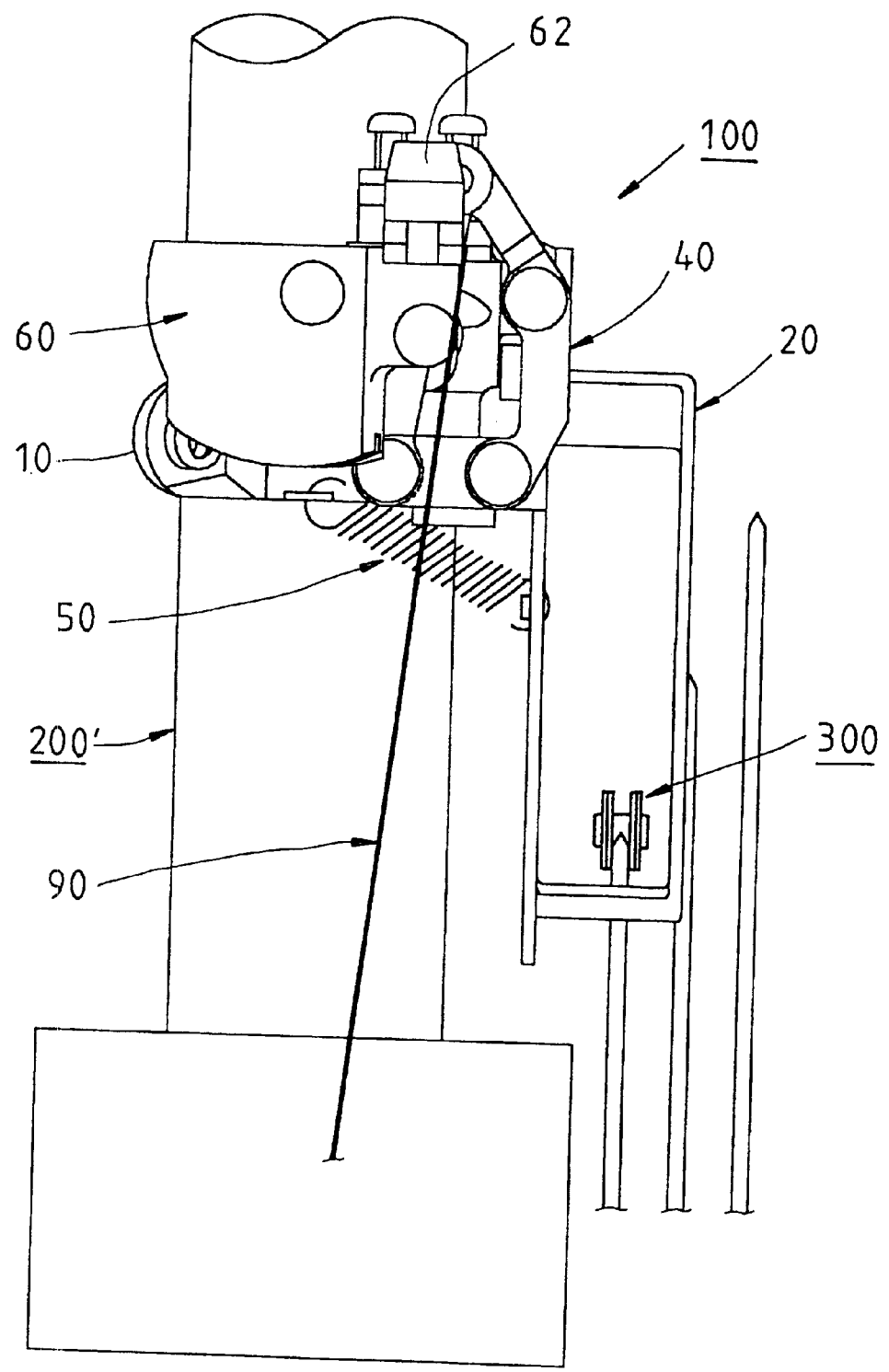
FIG. 7 shows a second application case and front view of the present invention to explain the link rod mechanism in the inactive state.
Figure 8:
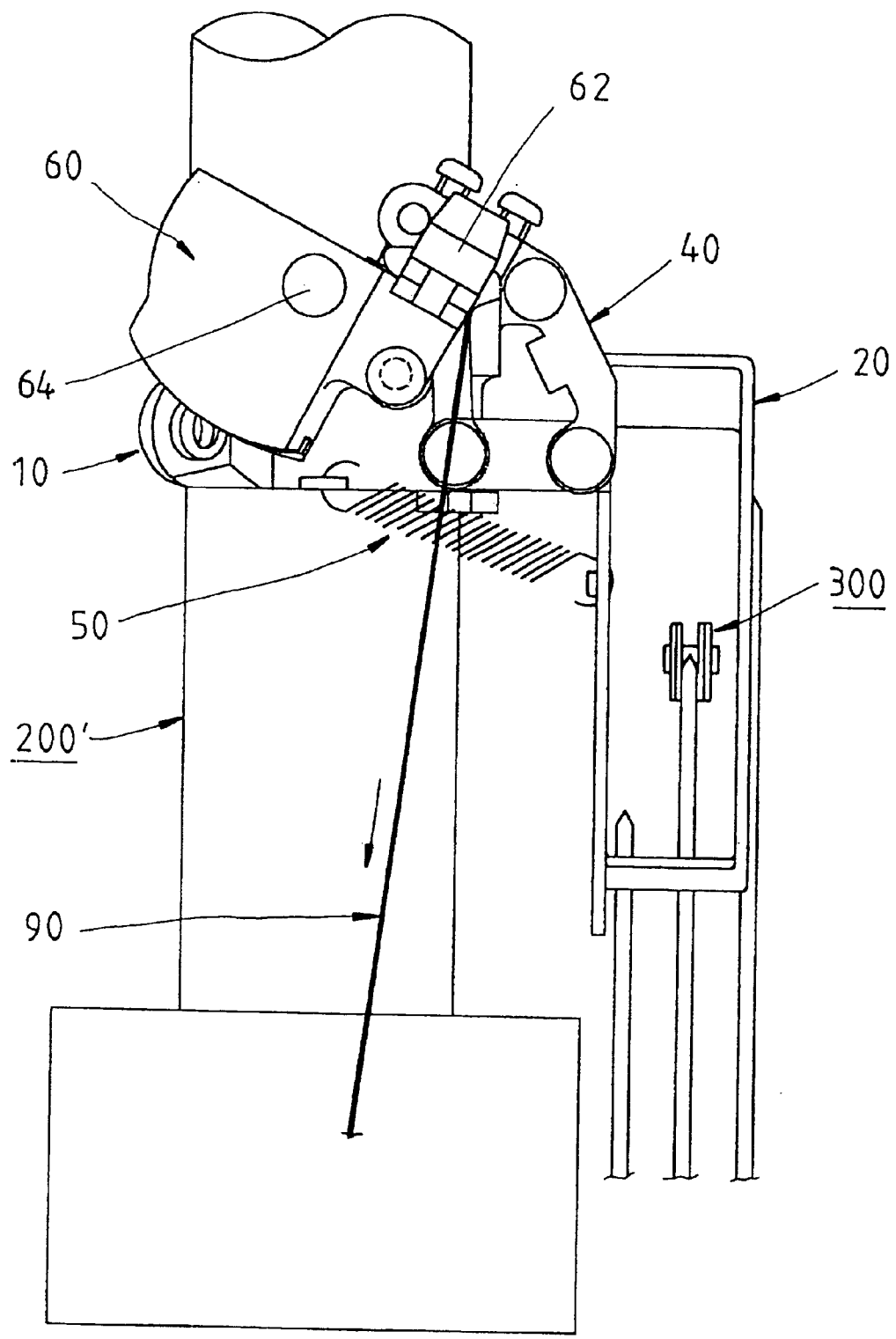
FIG. 8 shows a schematic view of the second application case of the present invention to explain the link rod mechanism in the state of swiveling action.

As shown in FIGS. 7 and 8, the bicycle frame 200' is devoid of the lug. The pull cord 90 is disposed along a crossing seat (not shown in the drawings) of the bottom of the bicycle frame 200' to be fastened with the start end 62 of the driven member 60. The crossing seat serves as a turning point of the change of the pulling direction of the pull cord 90. FIG. 7 shows the inaction of the link rod mechanism of the front speed changing device. As shown in FIG. 8, when the pull cord 90 is pulled, the start end 62 is pulled to displace downwards to link each rod member to swivel. In light of the link rod mechanism action being similar to that described above, it would not be further described.

In light of the pull cord of the front speed changing device 100 of the lower swiveling type being disposed along the bicycle frame, it does not interfere with the bicyclist. The front speed changing device 100 is suitable for use in various bicycle frames.

What is claimed is:

1. A front speed changing device comprising:

a base mounted on a bicycle frame;

a chain guiding member for guiding a chain to displace between a first position and a second position;

a first link rod pivoted at a first end with said base and connected at a second end to said chain guiding member;

a second link rod pivoted at a mid-section to said base and connected at a second end with said chain guiding member;

a recovery member enabling said chain guiding member to guide said chain to swivel toward said first position;

a pull cord capable of resisting a recovery force of said recovery member, so as to enable said chain guiding member to guide said chain to displace horizontally toward said second position;

wherein said front speed changing device is characterized by:

said second link rod which has an extension end, said first end of said second link rod being located between said extension end and said second end of said second link rod;

a driven member pivoted to said base and provided with a protruded portion and a start end;

a linking member pivoted at a first end with said extension end of said second link rod, and at a second end with said protruded portion of said driven member;

said pull cord being fastened, at one end with said start end of said driven member.

2. The front speed changing device as defined in claim 1, wherein said first end of said first link rod and said mid-section of second link rod are pivoting points; wherein the second ends are located under the pivoting joints and are swiveling ends; wherein said extension end of the second link rod is located over the mid-section and toward said first link rod.

3. The front speed changing device as defined in claim 1, wherein said driven member has a guide groove in which one end of said pull cord is disposed to fasten with said start end.

4. The front speed changing device as defined in claim 1, wherein said start end of said driven member and said protruded portion of said driven member are located on the same side.

5. The front speed changing device as defined in claim 1, wherein said recovery member is a tension spring which is fastened at one end with said base, and at other end with said chain guiding member.

* * * * *